Figure 1:
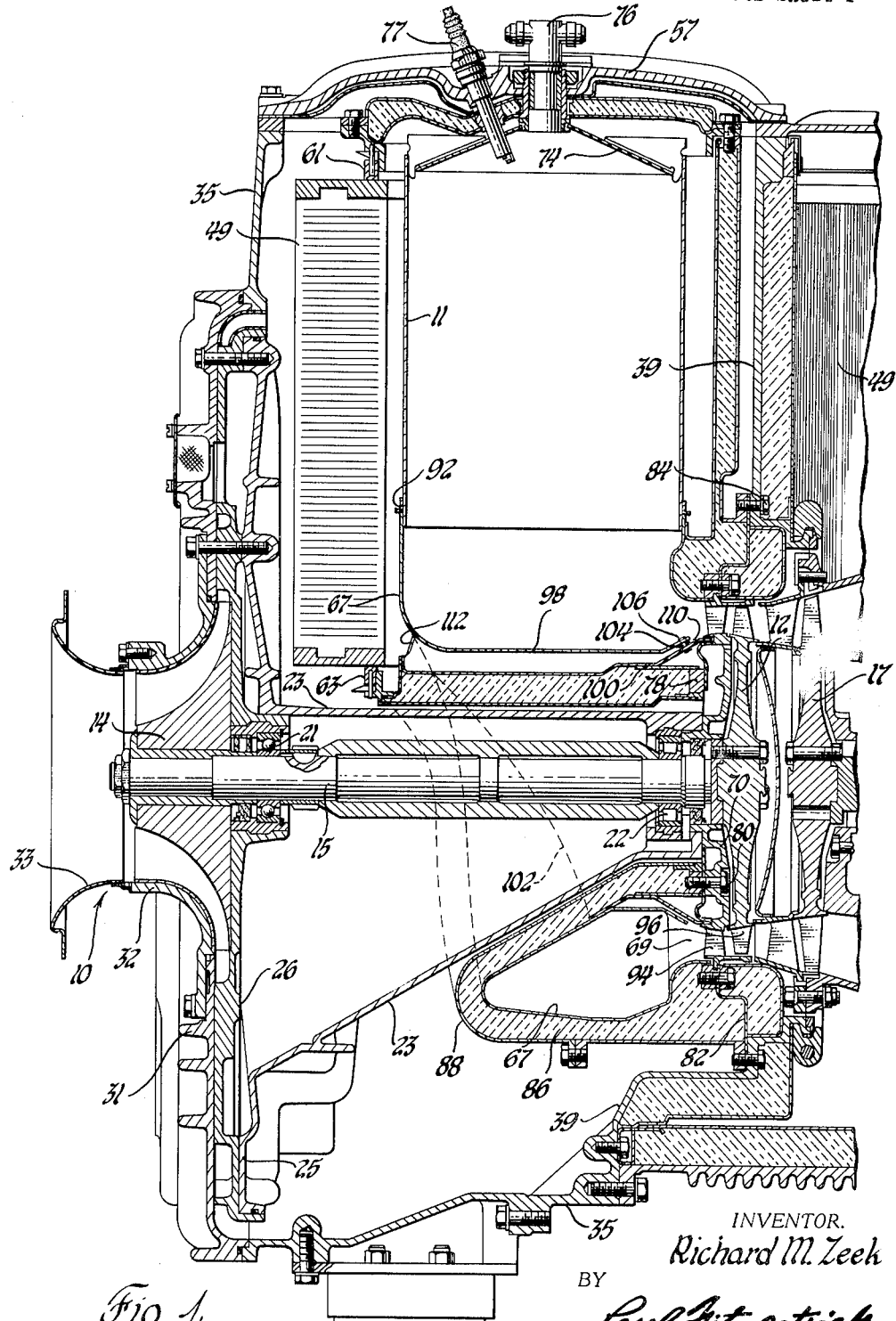

June 21, 1966 R. M. ZEEK 3,256,689
TURBINE COOLING
Filed Aug. 21, 1964 2 Sheets-Sheet 2
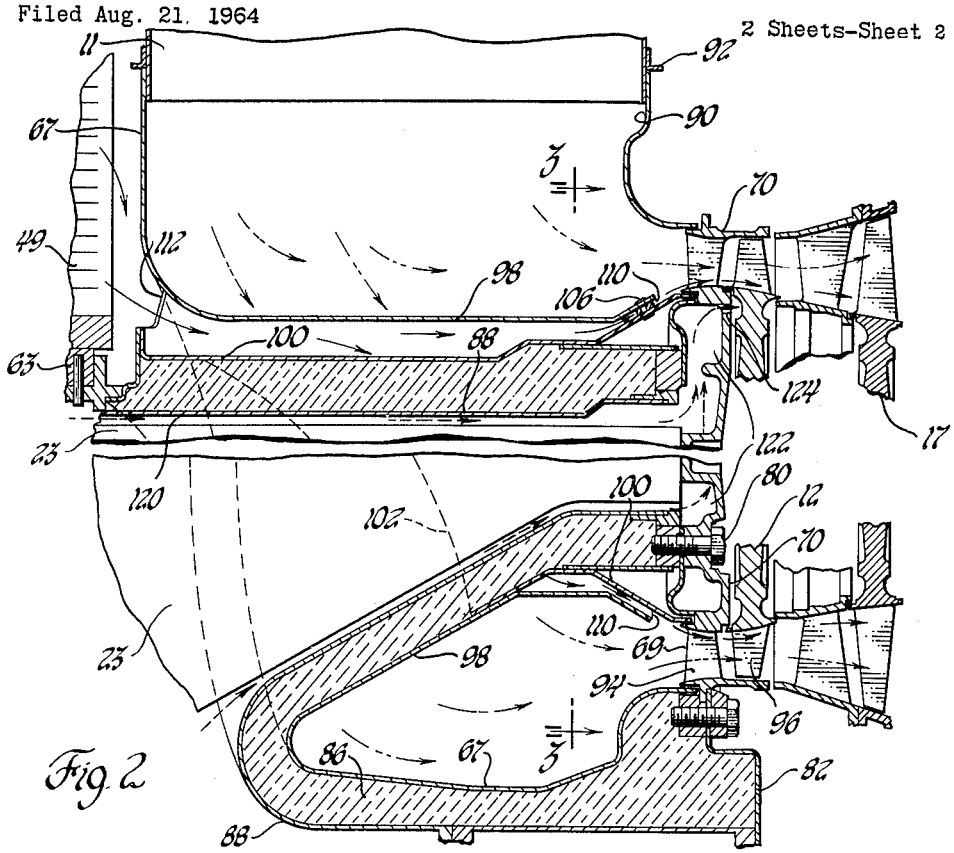
Fig. 2
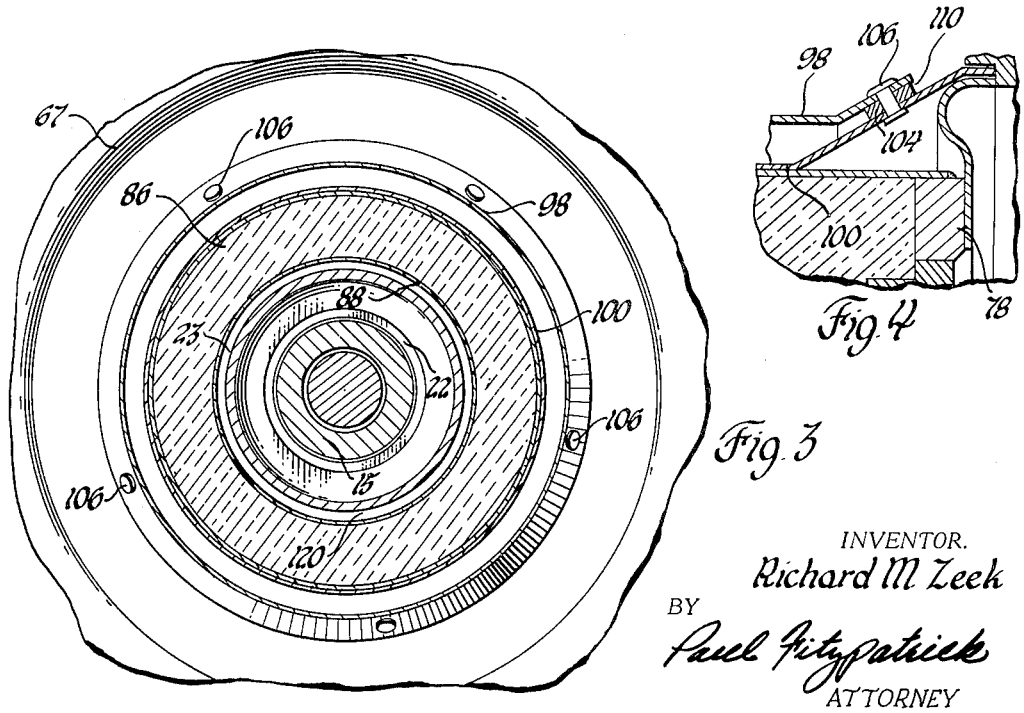
Fig. 3
Fig. 4
INVENTOR.
Richard M Zeek
BY
Paul Fitzpatrick
ATTORNEY United States Patent Office 3,256,689
Patented June 21, 1966

3,256,689
TURBINE COOLING
Richard M. Zeek, Utica, Mich., assignor to General Motors Corporation, Detroit, Mich., a corporation of Delaware
Filed Aug. 21, 1964, Ser. No. 391,240
5 Claims. (Cl. 60—39.51)

My invention is directed to an improved system for cooling gas turbines of the regenerative type which minimizes stresses due to thermal gradients in the turbine wheel. The invention is particularly advantageous in that it makes the use of one piece blade-and-wheel castings much more feasible and improves the endurance of such wheels. Particularly in starting a gas turbine, the blades become very hot very quickly whereas the rim of the wheel heats to a lesser extent and also heats much more slowly because of conduction into the wheel and the more massive structure of the rim. My invention involves flowing cooling air, derived from the regenerator, over the rim of the wheel. This cooling air heats up more gradually as the engine is started than the compressor discharge air or combustion products.

Cast integral disk and blade turbine rotors are extremely advantageous from the standpoint of cost reduction of gas turbines. One prime disadvantage of an integral cast rotor prior to this invention has been the cracks formed as a result of thermal stresses generated during a cold start of the engine. Before initiation of a cold start, the turbine rotor is at a uniform low ambient temperature. During the start, the turbine blades are heated to near turbine inlet temperature while the disk portion of the rotor remains near ambient temperature, imposing a thermal gradient in the disk of over 1000° F. The thermal gradient is a radial one starting at the blade root area and it is concentrated at the outer periphery of the disk. The thermal gradient causes a compressive stress at the outer periphery of the disk which is greater than the allowable stress of the material, causing yielding of the metal. When the engine and the rotor have reached a stabilized temperature the radial thermal gradient is greatly reduced because of the gradual heating up of the disk by conduction. Further, when the engine is shut down and has cooled off, there is no gradient. The metal at the periphery of the disk which has yielded in compression is now subjected to a high tensile stress and it cracks. The cracks are formed because the high radial temperature gradient occurs in the disk where there is no room for expansion and contraction of the metal.

In carrying my invention into practice, a discharge port for air heated by the regenerator is provided in such location as to direct this air as a film over the periphery of the disk to keep it cool during engine starts. Thus, the radial temperature gradient is concentrated in the blade portion of the rotor where there is adequate room for thermal growth of the metal. Thermal stress is thus greatly reduced, eliminating cracking.

Due to the considerable time required for the regenerator to heat up during a cold start, the port supplies the periphery of the disk with cool air at compressor discharge temperature during the start. However, when the engine and regenerators are up to operating temperature and there are no longer severe temperature gradients in the turbine disk, the air out of the port is only a few hundred degrees cooler than the temperature of the main gas stream through the turbine blades. Thus the film of cooling air has no significant effect on the efficiency of the turbine during normal running of the engine.

The nature of the invention and the advantages thereof will be more fully apparent upon consideration of the succeeding specification describing the preferred embodiment of the invention and the accompanying drawings, in which:

FIGURE 1 is a partial sectional view of a gas turbine engine taken on a plane containing the axis of the turbine;
FIGURE 2 is an enlarged view of a portion of FIGURE 1 with parts broken away, illustrating the flow paths;
FIGURE 3 is a cross-sectional view taken on the plane indicated by the line 3—3 of FIGURE 2; and
FIGURE 4 is an enlarged detail view of the rear margin of the nozzle box.

The invention is illustrated as embodied in a gas turbine engine which is described in the copending application of John S. Collman et al., of common ownership with this application, Serial No. 361,444, filed April 2, 1964. While the succeeding description is believed to fully explain the invention, recourse may be had to the Collman et al. application if needed.

It seems best to describe generally the engine structure in which the invention is embodied. The engine is a gas-coupled regenerative gas turbine engine including a compressor 10, a combustion chamber 11, and a turbine wheel 12, which drives the rotor 14 of the compressor through a shaft 15. These parts constitute a gas generator which supplies motive fluid to a power output turbine including a wheel 17. The gas generator shaft 15 is supported in bearings 21 and 22 within a shaft housing 23 having a circular flange 25 on its forward end. The flange 25 bolts to a circular compressor rear plate 26 which mounts the bearing 22. The compressor also includes a front cover 31, a rotor shroud 32, and an air inlet fitting 33. The compressor is fixed to an engine front case 35 which in turn is fixed to a bulkhead 39. The engine case 35 and bulkhead 39 are the principal enclosing parts of the plenum into which the compressor discharges and which may be termed the high pressure chamber. An upper cover 57 forms part of the enclosure.

The regenerator of the engine comprises a matrix drum 49 which rotates slowly about a vertical axis, passing through seals in the bulkhead 39 at two points. The air discharged by the compressor flows through the part of the matrix 49 which is ahead of the bulkhead into the combustion chamber 11, and the power turbine exhausts through the portion of the matrix which is aft of the bulkhead 39. The matrix 49 is preferably a metal structure which is extremely porous to radical air flow and serves to extract heat from the turbine exhaust gas and deliver heat to the compressed air flowing to the combusion chamber. The rims of the matrix are engaged by by-pass seals such as the upper by-pass seals 61 and the lower by-pass seals 63 which prevent by-passing of the matrix.

The combustion chamber 11 is disposed in the upper part of the case between the martix 48 and the bulkhead 39 with the axis vertical, as shown. Details of the combustion chamber, such as air entrance ports, are not illustrated, being immaterial to this invention. The open lower end of the combustion chamber fits into a circular opening in the upper side of a transition section or nozzle box 67 which terminates in an annular outlet 69 feeding through the gas generator turbine nozzle 70. The upper end of the combustion chamber is covered by a dome 74 into which a fuel nozzle 76 and igniter 77 extend from the upper cover 57 of the engine.

In operation of the gas generator, the air compressed by the compressor flows into the plenum or cool compressed air zone surrounding the matrix forward of the bulkhead, through the matrix where it is heated, and into the combustion chamber where it is further heated from combustion of fuel. The combustion products flow from the combustion chamber through the nozzle box 67 and first stage nozzle 70, driving the turbine wheel 12, which drives the compressor. The exhaust from the gas generator turbine is the motive fluid for the power turbine. The power turbine exhausts into a low pressure chamber defined by the rear case of the engine (not illustrated) within which the hot exhaust gases flow radially outward through the matrix 49 and into any suitable exhaust from the engine.

Proceeding with the details of the structure of the nozzle box and the turbine cooling flow paths, the nozzle box 67 has an internal flange 78 which is secured by bolts 80 to the diaphragm of the first stage turbine nozzle 70. This in turn is mounted on an offset sheet metal ring 82 which is fixed to the bulkhead by bolts 84. The lower portion of the nozzle box is heat insulated by a suitable insulating blanket 86 retained in a sheet metal enclosure 88. This structure is disposed around the generally annular shaft support 23 and spaced from it. The upper portion of the nozzle box defines a circular opening 90 within which the lower end of the combustion chamber 11 is received, a flange 92 on the combustion chamber engaging the top of the nozzle box. The nozzle box conducts the combustion gases around the shaft housing and allows them to flow rearwardly through the annular opening 69, through the vanes 94 of the first stage nozzle, and through the blades 96 of the turbine wheel 12. In the preferred construction, the blades 96 are cast as part of an integral wheel, but the invention is advantageously usable with assembled turbine rotors.

The portion of the nozzle box which immediately surrounds the shaft housing 23 and the inner part of the insulating blanket 86–88 comprises a somewhat funnel-shaped, generally annular portion 98 which defines the inner wall of the hot gas passage into the turbine. There is a second wall 100 disposed radially within the wall 98 which extends forwardly to the forward edge of the nozzle box above the shaft housing, but converges to a smaller dimension axially of the engine below the shaft housing. The forward edge of the inner wall 100 is indicated by the dotted line 102. The rear edge of the wall 100 extends beyond the wall 98 and abuts the nozzle 70. The spacing between the rear edge of the wall 98 and wall 100 is preserved by any suitable spacing means such as blocks 104 and rivets 106 illustrated in FIGURES 1 and 4. Except for the slight interruption caused by the spacers 104, the parts 98 and 100 define between them a full annular port 110 for the discharge of a film of cooling air from the regenerator over the periphery of the turbine wheel and the bases of the blades. The air is conducted to this port through the space between walls 98 and 100 and it enters into this space through an opening 112 at the forward side of the nozzle box near the regenerator matrix 49. The path of this air is indicated by the solid arrows in FIGURE 2. The turbine motive fluid is indicated by the broken line arrows which flow through the outlet 69.

There is additional cooling air, which is supplied from the compressor, by-passing the matrix and combustion chamber, through the annular passage 120 between the shaft housing 23 and the insulating cover 88. This air flows, as indicated by the dotted arrows, into a recess or chamber 122 at the forward side of the nozzle 70 from which it passes through a number of small metering orifices 124 adjacent the rim of the turbine wheel 12 and flows over the rim and ultimately into the motive fluid path through the gap between the first stage nozzle and wheel.

When the engine is in normal operation, compressor discharge air at about 400° F. flows to the face of the turbine wheel to cool it. Air heated by the regenerator to about 1100° F. flows over the rim of the wheel and the base of the blades. The combustion products at about 1700° F. constitute by far the greater portion of the flow through the turbine blades, this hot motive fluid being partially insulated from the turbine by the film of cool air. However, when the engine is started, the cooling air film is relatively cool and heats up gradually as the regenerator absorbs heat while the engine is in operation. There is thus a gradual heating of the turbine rim rather than a rapid one, but the gases which cool the turbine rim are heated sufficiently to be useful in the production of power by the engine due to their passage through the regenerator, once the engine is in normal operation.

Experience with the operation of an engine embodying the invention indicates that there is no appreciable adverse effect on the efficiency of the engine due to the use of regenerator-heated air to cool the turbine. This may be due to the fact that the air is at a relatively high temperature.

Certain additional facts which may be helpful in understanding the invention may be mentioned.

The port through which the turbine rim receives cooling air (port 110) is not necessarily annular, although preferably so. The cooling air may be discharged over only a portion of the circumference of the turbine wheel. Because of the rapid rotation of the turbine wheel, the wheel is affected by the average temperature of the gases around the annulus and, therefore, discharge over a portion of the circumference has a proportional cooling effect.

In the engine specifically described herein, it may be noted that the cooling air taken directly from the compressor and fed to the turbine disk through the metering ports 124 is ordinarily less than one percent of total engine air flow. The cooling air derived from the regenerator through port 110 may be about eight percent of total engine air flow.

It will be clear, of course, that these figures may be varied to suit the design of the particular engine and to conform to the criteria favored by the designer of the engine. Thus, the figures stated above are merely illustrative of the preferred values for the particular engine described herein.

The detailed description of the preferred embodiment of the invention should not be considered as limiting or restricting the invention, since many changes may be made by the exercise of skill in the art.

I claim:
1. A gas turbine engine comprising a compressor, a regenerator, a combustion apparatus, and a turbine coupled to the compressor, these being connected for flow of compressed air from the compressor through the regenerator to the combustion apparatus and for flow of combustion products from the combustion apparatus through the turbine to the regenerator,
   the turbine comprising a wheel including blades extending from the rim of the wheel,
   the engine having turbine cooling means comprising:
   means conducting compressed air from the compressor, by-passing the regenerator and the combustion apparatus, to cool the wheel; and
   conduit means by-passing and separated from the combustion apparatus conducting compressed air free of combustion products from the regenerator to the periphery of the wheel and the base of the blades to isolate the periphery of the wheel from the combustion products flowing from the combustion apparatus.

2. A gas turbine engine comprising a compressor, a regenerator, a combustion apparatus, and a turbine coupled to the compressor, these being connected for flow of compressed air from the compressor through the regenerator to the combustion apparatus and for flow of combustion products from the combustion apparatus through the turbine to the regenerator,
   the turbine comprising a wheel including blades extending from the rim of the wheel,
   the engine having turbine cooling means comprising:
   means conducting compressed air from the compressor, by-passing the regenerator and the combustion apparatus, to the outer portion of the face of the wheel; and
   conduit means by-passing and separated from the combustion apparatus conducting compressed air free of combustion products from the regenerator to the periphery of the wheel and the base of the blades to discharge as a film over the periphery of the wheel to isolate the wheel from the combustion products flowing from the combustion apparatus.

3. A gas turbine engine comprising a compressor, a regenerator, a combustion apparatus, and a turbine coupled to the compressor, these being connected for flow of compressed air from the compressor through the regenerator to the combustion apparatus and for flow of combustion products from the combustion apparatus through the turbine to the regenerator, the turbine comprising a wheel with blades extending from the rim of the wheel, a nozzle box extending from the combustion apparatus to the turbine and terminating in an annular outlet into the turbine, means for metering turbine cooling air from the compressor into the turbine, by-passing the regenerator and combustion apparatus, means defining an annular discharge port at the inside of the nozzle box outlet disposed to discharge a film of cooling air over the rim of the wheel and the base of the blades, and a conduit for compressed air from the rgenerator to the said discharge port by-passing the combustion apparatus.

4. A gas turbine engine comprising a compressor, a regenerator, a combustion apparatus, and a turbine coupled to the compressor, these being connected for flow of compressed air from the compressor through the regenerator to the combustion apparatus and for flow of combustion products from the combustion apparatus through the turbine to the regenerator, the turbine comprising a wheel with blades extending from the rim of the wheel, the engine having a shaft housing extending from the compressor to the turbine, a nozzle box extending from the combustion apparatus to the turbine disposed around the shaft housing and terminating in an annular outlet into the turbine, the nozzle box being spaced from the shaft housing to define an annular passage from the compressor outlet to the turbine to supply cooling air to the turbine, means defining a discharge port at the inside of the nozzle box outlet disposed to discharge a film of cooling air over the rim of the wheel and the base of the blades, and a conduit for compressed air from the regenerator to the said discharge port by-passing the combustion apparatus.

5. A gas turbine engine comprising a compressor, a regenerator, a combustion apparatus, and a turbine coupled to the compressor, these being connected for flow of compressed air from the compressor through the regenerator to the combustion apparatus and for flow of combustion products from the combustion apparatus through the turbine to the regenerator, the turbine comprising a wheel with blades extending from the rim of the wheel, the engine having a shaft housing extending from the compressor to the turbine, a nozzle box extending from the combustion apparatus to the turbine disposed around the shaft housing and terminating in an annular outlet into the turbine, an insulating layer disposed between the shaft housing and nozzle box spaced from the shaft housing to define an annular passage from the compressor outlet to the turbine, means for metering compressed air from the said passage into the turbine, means defining an annular discharge port at the inside of the nozzle box outlet disposed to discharge a film of cooling air over the rim of the wheel and the base of the blades, and a conduit for compressed air from the regenerator to the said discharge port by-passing the combustion apparatus.

References Cited by the Examiner
UNITED STATES PATENTS 3,116,605 1/1964 Amann _____ 60—39.51
3,191,707 6/1965 Peterson _____ 60—39.51 X MARK NEWMAN, *Primary Examiner.*

RALPH D. BLAKESLEE, *Examiner.*